(12) United States Patent
Xu et al.

(10) Patent No.: US 10,940,885 B2
(45) Date of Patent: Mar. 9, 2021

(54) STEERING KNUCKLE OF VEHICLE TURNING WHEEL, STEERING DEVICE AND VEHICLE

(71) Applicant: CITIC Dicastal CO., LTD., Hebei (CN)

(72) Inventors: Zuo Xu, Qinhuangdao (CN); Dexi Du, Qinhuangdao (CN); Dadong Wang, Qinhuangdao (CN); Weidong Liu, Qinhuangdao (CN); Shaoqian Wang, Qinhuangdao (CN); Shiwen Xu, Qinhuangdao (CN); Zhihua Zhu, Qinhuangdao (CN)

(73) Assignee: CITIC Dicastal CO., LTD., Qinhuangdao (CN)

( * ) Notice: Subject to any disclaimer, the term of this patent is extended or adjusted under 35 U.S.C. 154(b) by 40 days.

(21) Appl. No.: 16/391,435

(22) Filed: Apr. 23, 2019

(65) Prior Publication Data
US 2020/0070883 A1 Mar. 5, 2020

(30) Foreign Application Priority Data
Sep. 5, 2018 (CN) .......................... 201811032517.3

(51) Int. Cl.
*B60G 3/20* (2006.01)
*B62D 7/18* (2006.01)
*B62D 5/04* (2006.01)

(52) U.S. Cl.
CPC ................. *B62D 7/18* (2013.01); *B60G 3/20* (2013.01); *B62D 5/0418* (2013.01);
(Continued)

(58) Field of Classification Search
CPC ...... B62D 7/18; B62D 5/0418; B60K 17/303; B60G 2206/50; B60G 3/20;
(Continued)

(56) References Cited

U.S. PATENT DOCUMENTS 4,877,098 A 10/1989 Asanuma
4,972,914 A 11/1990 Asanuma
(Continued)

FOREIGN PATENT DOCUMENTS

DE 19638842 A1 * 4/1998 ............. B62D 65/00
EP 0291087 A1 11/1988
(Continued)

OTHER PUBLICATIONS

Supplementary European Search Report in the European application No. 19194853.8, dated Jan. 31, 2020, 8 pgs.

*Primary Examiner* — Ruth Ilan
(74) *Attorney, Agent, or Firm* — Cooper Legal Group, LLC (57) ABSTRACT

A steering knuckle of a vehicle turning wheel, a steering device and a vehicle. The steering knuckle includes a steering end connected to a turning wheel and a driving end connected to a steering driving component of the turning wheel, in which the driving end is located above or below the side of the steering end; the steering end is provided with a first connecting hole, and the driving end is provided with a second connecting hole; the axis of the second connecting hole and the axis of the first connecting hole are in the same plane, and the axis of the second connecting hole is not parallel to the axis of the first connecting hole.

6 Claims, 3 Drawing Sheets

(52) U.S. Cl.
CPC .... *B60G 2200/144* (2013.01); *B60G 2200/44* (2013.01); *B60G 2206/50* (2013.01)

(58) Field of Classification Search
CPC .......... B60G 2300/50; B60G 2200/144; B60G 2200/44; B60G 2200/422
USPC ........................................................ 180/402
See application file for complete search history.

(56) References Cited

U.S. PATENT DOCUMENTS

| | | | |
|---|---|---|---|
| 6,206,132 B1 | 3/2001 | Urbach | |
| 6,367,571 B1* | 4/2002 | Schwarz | B60K 7/0007 180/252 |
| 7,024,842 B2* | 4/2006 | Hunt | A01D 34/008 56/6 |
| 7,204,341 B2* | 4/2007 | Lundmark | B60G 7/008 180/402 |
| 7,419,172 B2* | 9/2008 | Hsieh | B62D 7/18 280/93.51 |
| 7,866,434 B2* | 1/2011 | Shiino | B62D 5/0418 180/411 |
| 8,857,833 B2* | 10/2014 | Deierling | B62D 7/18 280/93.512 |
| 9,821,835 B2* | 11/2017 | Ferrer-Dalmau Nieto | B62D 5/0418 |
| 10,293,847 B2* | 5/2019 | Calmettes | B60K 7/0007 |
| 10,358,165 B2* | 7/2019 | Reid | B60B 27/0036 |
| 2007/0045036 A1* | 3/2007 | Takeuchi | B60G 17/005 180/411 |
| 2014/0265202 A1* | 9/2014 | Bunker | B62D 7/18 280/93.512 |
| 2018/0066720 A1* | 3/2018 | Dilworth | B62D 7/18 |
| 2019/0248233 A1 | 8/2019 | Calleija et al. | |
| 2020/0224728 A1* | 7/2020 | Gao | B62D 5/04 |

FOREIGN PATENT DOCUMENTS

| | | |
|---|---|---|
| EP | 0334691 A1 | 9/1989 |
| EP | 1057714 A2 | 12/2000 |
| EP | 1757469 A1 | 2/2007 |
| WO | 2017214686 A1 | 12/2017 |

* cited by examiner

STEERING KNUCKLE OF VEHICLE TURNING WHEEL, STEERING DEVICE AND VEHICLE

CROSS-REFERENCE TO RELATED APPLICATIONS

The present application claims benefit of Chinese Application No. 201811032517.3, filed on Sep. 5, 2018, the contents of which are hereby incorporated by reference in its entirety.

BACKGROUND

In the centuries since the birth of the vehicle, the vehicle steering system has been greatly developed. The types of the vehicle steering systems generally include five types: mechanical steering system, Hydraulic Power Steering System (HPS), Electronic Hydrostatic Power Steering System (EHPS), Electric Power Steering System (EPS) and Steer By Wire System (SBW). Among them, the Steer By Wire System eliminates the mechanical connection between the steering wheel and the turning wheels of the vehicle. Instead, the communication between the steering control component and the steering execution component is established through a communication network, that is, the steering control component controls the steering execution component according to the user instruction, and the steering execution component drive the turning wheels of the vehicle to turn. Therefore, the Steer By Wire System has the advantages of quick judgment on the driving intention, and rapid and flexible steering of the vehicle, and at the same time, it has the advantages of small occupied space and reduced damage to the driver when the vehicle collides, which is very suitable for the intelligent requirements of the vehicle. Therefore, the Steer By Wire System has become a research hotspot and future development trend of current vehicle steering systems.

However, in the existing steering device, a tie rod is provided to be connected to the steering knuckle, and the knuckle is provided with a structure connected to the steering arm and a shaft connected to the turning wheel, thereby resulting in the existing steering device having problems of complex structure and large space occupation, so that the requirements of today's society for the intelligence and lightweight of vehicles.

SUMMARY

The present disclosure relates to a steering system technology for a vehicle, and more particularly to a steering knuckle of a vehicle turning wheel, a steering device and a vehicle.

In view of this, an object of the present disclosure is to provide a steering device having a simple structure and occupying a small space.

In order to achieve the above object, the technical solution of the present disclosure is achieved as follows:

The present disclosure provides a steering knuckle of a vehicle turning wheel, the steering knuckle includes a steering end connected to a turning wheel and a driving end connected to a steering driving component of the turning wheel, the driving end is located above or below the side of the steering end, and the steering end and the driving end are fixedly connected; the steering end is provided with a first connecting hole, and the driving end is provided with a second connecting hole;

the axis of the second connecting hole and the axis of the first connecting hole are in the same plane, and the axis of the second connecting hole is not parallel to the axis of the first connecting hole.

The steering knuckle further includes a damping end connected to the vehicle body of the vehicle, in which the damping end is located above the side of the steering end, and the driving end is located below the side of the steering end; the damping end, the steering end and the driving end are fixedly connected, and the damping end, the steering end and the driving end form a C-shape.

The steering knuckle, the damping end is provided with a third connecting hole, and the second connecting hole and the axis of the third connecting hole are located in the same line.

the axes of the first connecting hole, the second connecting hole and the third connecting hole are all in the same plane, the axes of the second connecting hole and the third connecting hole are non-perpendicularly intersected with the axis of the first connecting hole, and the upper ends of the axes of the second connecting hole and the third connecting hole tilt a preset angle to the side away from the first connecting hole.

the steering knuckle further includes at least two brake caliper mounting portions, in which the brake caliper mounting portions are disposed on the side of the steering end, and the brake caliper mounting portions are provided with at least one mounting hole.

A steering device of a vehicle turning wheel is characterized in that the steering device includes a steering driving component and the steering knuckle; the steering driving component includes a fixing portion and a driving portion, in which one end of the fixing portion is mounted with the driving portion, and the other end is connected to the vehicle body of the vehicle; the driving portion is fixedly connected to the second connecting hole, and when the driving portion rotates, the steering knuckle rotates with the rotation of the driving portion.

The steering device, the steering knuckle further includes a damping end connected the vehicle body of the vehicle, in which the damping end is located above the side of the steering end, and the driving end is located below the side of the steering end; the damping end is provided with a third connecting hole connected to the vehicle body, and the axes of the second connecting hole and the third connecting hole are located in the same line; the damping end, the steering end and the driving end are all fixedly connected, and the damping end, the steering end and the driving end form a C-shape.

The steering device, the axes of the first connecting hole, the second connecting hole and the third connecting hole are all in the same plane, the axes of the second connecting hole and the third connecting hole are non-perpendicularly intersected with the axis of the first connecting hole, the upper ends of the axes of the second connecting hole and the third connecting hole tilt a preset angle to the side away from the first connecting hole.

The steering device, the steering driving component is a motor, in which the housing of the motor is the fixing portion, and the output shaft of the motor is the driving portion.

The steering device, the lower end of the housing of the motor is provided with a bearing, in which the output shaft is rotatably inserted in the bearing and connected to the steering knuckle through the bearing; the steering device is further provided with an axial fixing part for fixing the steering knuckle and the steering driving component, in which the axial fixing part is fixedly sleeved on the lower end of the output shaft, and the upper end of the axial fixing part abuts against the bottom end of the steering knuckle.

The steering device, the steering device further includes an upper cross arm and a lower cross arm; the upper cross arm is disposed above the steering knuckle and is connected with the damping end; the lower cross arm is disposed below the steering knuckle and is connected with the fixing portion; the upper cross arm can rotate up-and-down or back-and-forth with the connection point of the upper cross arm and the damping end as the pivot, and the lower cross arm can rotate up-and-down with the connection point of the lower cross arm and the fixing portion as the pivot; a damper is disposed between the upper cross arm and the lower cross arm, in which the damper is located at the side of the motor facing away from the first connecting hole; the lower end of the damper is connected to the lower cross arm, and the preset force direction of the damper is the vertical direction.

A vehicle is characterized in that the vehicle includes a turning wheel and the steering device; the axle of the turning wheel is coupled to the steering knuckle by the first connecting hole.

A steering knuckle of a vehicle turning wheel, a steering device and a vehicle of the present disclosure, including a steering end connected to a turning wheel and a driving end connected to a steering driving component of the turning wheel, in which the driving end is located above or below the side of the steering end; the steering end is provided with a first connecting hole, and the driving end is provided with a second connecting hole; the axis of the second connecting hole and the axis of the first connecting hole are in the same plane, and the axis of the second connecting hole is not parallel to the axis of the first connecting hole; it can be seen that the steering knuckle of the vehicle turning wheel, the steering device and the vehicle of the present disclosure eliminate the steering tie rod and the steering arm, so that the structure is simpler and the space occupation is smaller.

LIST OF REFERENCE SYMBOLS 1 steering knuckle
11 steering end
111 first connecting hole
12 driving end
121 second connecting hole
13 damping end
131 third connecting hole
14 brake caliper mounting portion
2 turning wheel
3 steering driving component
31 fixing portion
32 driving portion
4 bearing
5 axial fixing part
6 upper cross arm
7 lower cross arm
701 damper seat
8 damper
9 support member
10 pins

DETAILED DESCRIPTION

Embodiments of the present disclosure provide a steering knuckle of a vehicle turning wheel, in which the steering knuckle includes a steering end connected to a turning wheel and a driving end connected to a steering driving component of the turning wheel, in which the driving end is located above or below the side of the steering end; the steering end is provided with a first connecting hole connected to a turning wheel, and the driving end is provided with a second connecting hole connected to a steering driving component; the axis of the second connecting hole and the axis of the first connecting hole are in the same plane, and the axis of the second connecting hole is not parallel to the axis of the first connecting hole.

The steering knuckle of the vehicle turning wheel the embodiment of the present disclosure eliminates the connection structure originally used for connecting the steering tie rod and the steering arm, so that the structure is simpler and the space occupation is smaller Compared with the steering knuckle of the prior art, the steering knuckle of the embodiment of the present disclosure is an omitted disclosure, and the same function as the prior art can be obtained in the case where the structure is simpler and the space occupation is smaller.

The detailed technical solution of the present disclosure will be described in detail with reference to the accompanying drawings and specific embodiments. It should be understood that the accompanying drawings and examples are only used to explain the present disclosure and are not used to define the present disclosure.

In order to clearly describe the detailed technical solutions of the embodiments of the present disclosure, the upper and lower directions described below are the directions in which the steering knuckle and the steering device of the embodiment of the present disclosure have been mounted on the vehicle.

Embodiment 1

Figure 1:
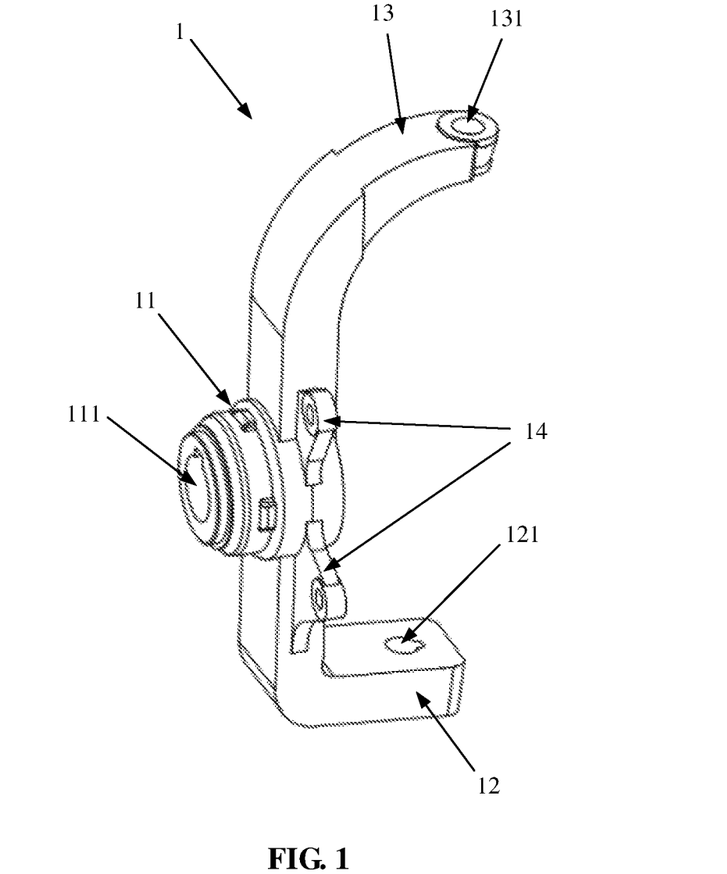
FIG. 1 is a schematic view of a steering knuckle of a vehicle turning wheel according to Embodiment 1 of the present disclosure.

As shown in FIG. 1, an embodiment of the present disclosure provides a steering knuckle of a vehicle turning wheel. The steering knuckle 1 includes a steering end 11 and a driving end 12, in which the driving end 12 is located below the side of the steering end 11. The steering end 11 is provided with a first connecting hole 111, and the first connecting hole 111 is used to connected to the turning wheel 2 (see FIG. 2); and the driving end 12 is provided with a second connecting hole 121, and the second connecting hole 121 is used to connect to the steering driving component 3 (see FIG. 2). The axis of the second connecting hole 121 and the axis of the first connecting hole 111 are in the same plane, and the axis of the second connecting hole 121 is not parallel to the axis of the first connecting hole 111.

In the present embodiment, the purpose of disposing the driving end 12 below the side of the steering end 11 is to leave sufficient space for mounting the steering drive component; those skilled in the art can understand that it is also possible that the driving end 12 is located above the side of the steering end 11.

In the present embodiment, the purpose of the axis of the second connecting hole 121 and the axis of the first connecting hole 111 being in the same plane is to minimize the distance between the steering wheel and the second connecting hole, that is, to reduce the length of the resistance arm; the purpose of the axis of the second connecting hole 121 being non-parallel to the axis of the first connecting hole 111 is to facilitate the provision of the steering driving component, and generally, the movement provided by the steering driving component is a rotary motion, thus in order to achieve the turning movement (that is, the horizontal rotation) of the turning wheel, it is best that the axis of the rotary motion of the steering driving component is in the vertical direction. Of course, in actual implementation, when considering other factors, the axis of the rotary motion of the steering driving component is not vertical and will be inclined to both sides of the vehicle. However, it can be understood that the axis of the second connecting hole 121 and the axis of the first connecting hole 111 cannot be parallel, otherwise the turning of the turning wheel cannot be realized.

In the present embodiment, the steering knuckle 1 further includes a damping end 13 connected to the vehicle body of the vehicle, in which the damping end 13 is located above the side of the steering end 11; the damping end 13, the steering end 11 and the driving end 12 are all fixedly connected, and the damping end 13, the steering end 11 and the driving end 12 form a C-shape, that is, the steering end 11 is in the middle of the C-shape, and the damping end 13 and the driving end 12 are respectively located on the upper and lower ends of the C-shape. The damping end 13, the steering end 11 and the driving end 12 form the C-shape, so that the two ends of the steering knuckle are closer to symmetry and the force is more balanced, which helps to improve the service life of the steering knuckle. Those skilled in the art will appreciate that the steering knuckle is used for turning the turning wheel, and the function of the steering knuckle is not affected by the absence of a damping end.

Specifically, the damping end 13, the steering end 11 and the driving end 12 are integrally formed, so that the strength is better, the manufacturing efficiency is high, and the cost is low; but it can be understood that it is also possible to assemble the damping end 13, the steering end 11 and the driving end 12 separately after manufacture. More specifically, the damping end 13, the steering end 11 and the driving end 12 may be integrally formed by casting, and therefore, the steering knuckle may set corresponding process features, such as casting fillet, draft angle and the like, according to the casting process. It should be understood that these process features do not affect the function of the steering knuckle.

In the present embodiment, the damping end 13 is provided with a third connecting hole 131, in which the third connecting hole 131 is located at the end of the damping end 13, and the third connecting hole 131 and the axis of the second connecting hole 121 are located in the same line. When the steering driving component 3 drives the steering knuckle 1 to rotate, the two ends of the steering knuckle 1 are jointly defined by the second connecting hole 121 and the third connecting hole 131, so that the steering knuckle is prevented from becoming a cantilever beam, and the rotation of the steering knuckle is more stable. In addition, the steering knuckle 1 is connected to the vehicle via the driving end 12 and the damping end 13, and the two ends are simultaneously subjected to force, which reduces the frictional force when the steering knuckle rotates, reduces the wear of the steering knuckle, and improves the life of the steering knuckle. It can be understood that the damping end 13 may not be provided with the third connecting hole 131, but may be connected to the vehicle body of the vehicle via other structures. For example, the damping end 13 is connected to the vehicle body of the vehicle via a pin shaft provided at the damping end 13.

In the present embodiment, the axes of the first connecting hole 111, the second connecting hole 121 and the third connecting hole 131 are all in the same plane, the axes of the second connecting hole 121 and the third connecting hole 131 are non-perpendicularly intersected with the axis of the first connecting hole 111, the upper ends of the axes of the second connecting hole 121 and the third connecting hole 131 tilt a preset angle to the side away from the first connecting hole 111. In this way, the same technical effect as the kingpin inclination technology of the prior art can be achieved, that is, it is beneficial to the automatic return of steering wheel. Preferably, the preset angle is 5°-8°, that is, the rotation axis of the steering knuckle inclines inward by 5°-8° with respect to the turning wheel of the vehicle.

In the present embodiment, the first connecting hole 111 and the second connecting hole 121 are both flat key slotted holes or spline slotted slots, thus a key can be set on the driving shaft of the turning wheel axle or the steering driving component, so that the torque can be stably transmitted, the circumferential sliding when driving is avoided, and the structure is simple. However, it can be understood that the first connecting hole 111 and the second connecting hole 121 can also be holes of other shapes, for example, the torque can be transmitted via tapered holes, or the torque can be transmitted via cylindrical holes with pins.

In the present embodiment, the third connecting hole 131 is a tapered hole for mounting a ball stud, in which the tapered hole can generate a self-tightening force by the gravity of the vehicle, so that the connection between the ball stud and the third connecting hole 131 is tighter; however, it can be understood that the third connecting hole 131 may also be a hole of other shapes, such as a cylindrical hole with pins a hole retaining ring, etc.

In the present embodiment, the steering knuckle 1 further includes at least two brake caliper mounting portions 14, in which the brake caliper mounting portions 14 are disposed on the side of the steering end 11, and the brake caliper mounting portions 14 are provided with one mounting hole. The brake caliper mounting portions 14 are used for mounting a brake caliper. In this way, the steering knuckle 1 can conveniently mount the brake caliper, which is matched with the brake device design of the vehicle. If the brake device design of the vehicle does not require the brake caliper mounting portion to be provided at the steering knuckle, the brake caliper mounting portions 14 may not be provided. It can be understood that the brake caliper mounting portions 14 can also be provided with two or more mounting holes as needed.

Embodiment 2

Figure 2:
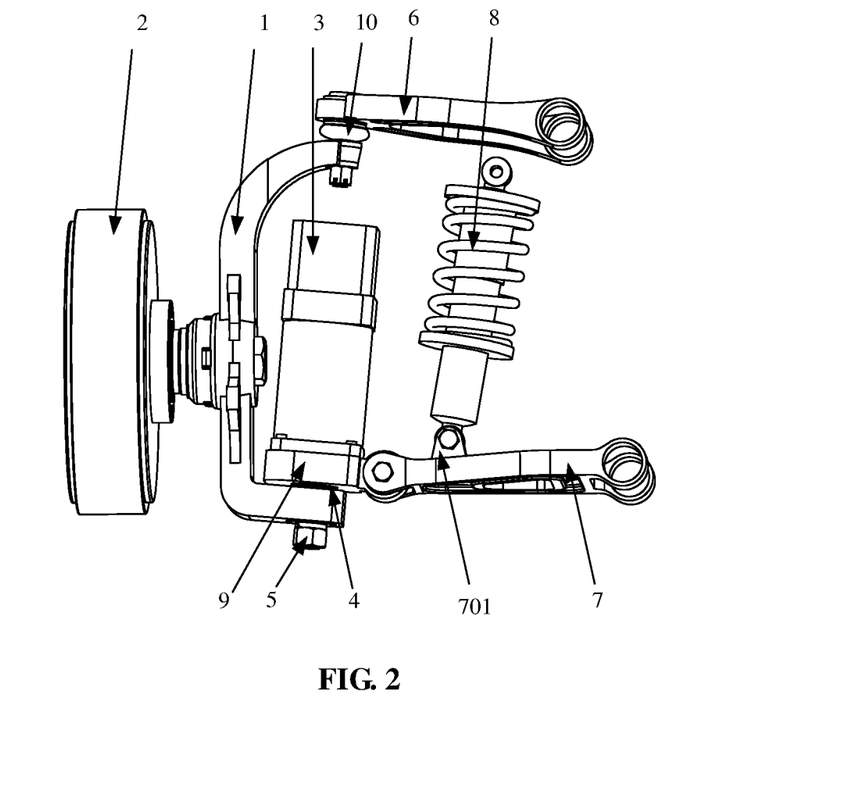
FIG. 2 is a schematic view of a steering device of a vehicle turning wheel according to Embodiment 2 of the present disclosure.
Figure 3:
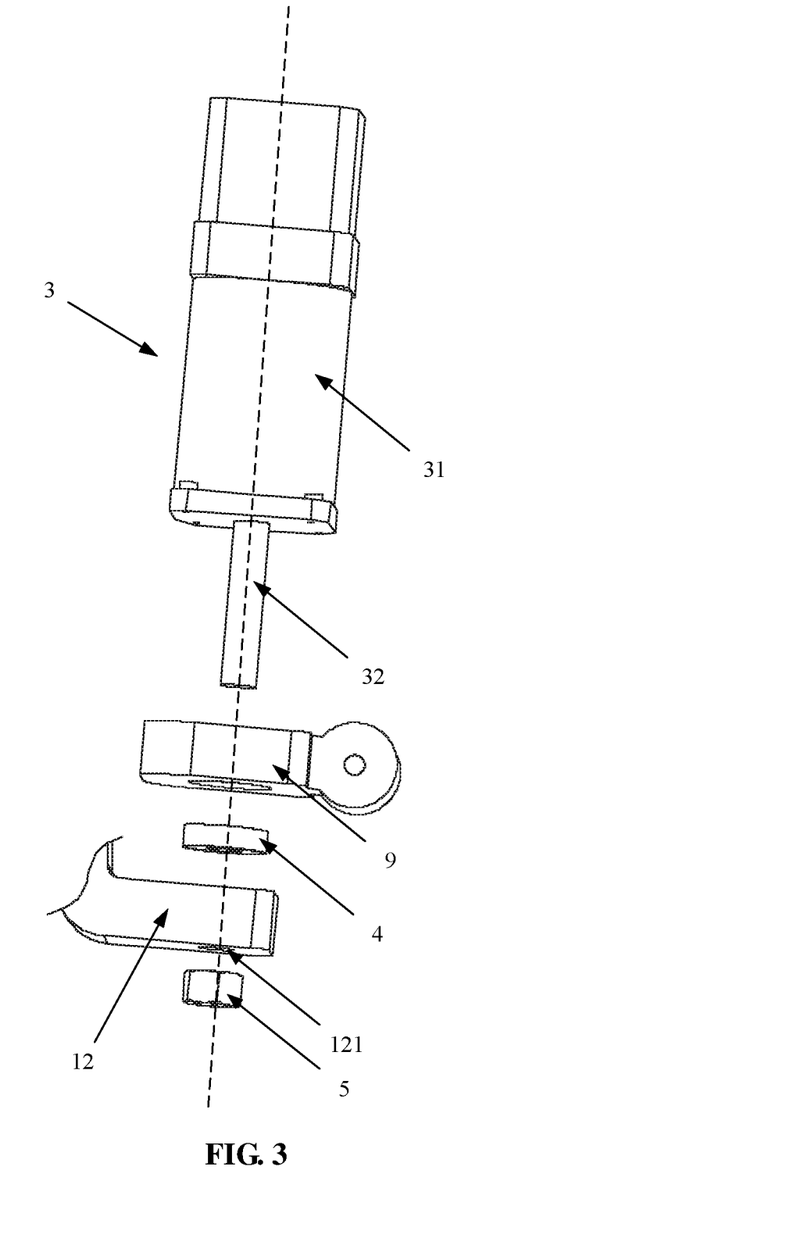
FIG. 3 is an exploded perspective view showing a steering drive part of the steering device for the vehicle turning wheel according to Embodiment 2 of the present disclosure.

As shown in FIG. 2 and FIG. 3, an embodiment of the present disclosure further provides a steering device of a vehicle turning wheel, in which the steering device includes a steering driving component 3 and a steering knuckle 1 according to Embodiment 1. The steering driving component 3 includes a fixing portion 31 and a driving portion 32, in which one end of the fixing portion 31 is mounted with the driving portion 32, and the other end is connected to the vehicle body of the vehicle. The driving portion 32 is fixedly connected to the second connecting hole 121, and when the driving portion 32 rotates, the steering knuckle 1 rotates with the rotation of the driving portion 32.

In the present embodiment, the steering driving component 3 is a motor, in which the housing of the motor is the fixing portion 31, and the output shaft of the motor is the driving portion 32, that is, the motor is mounted on the inner wall of the housing of the motor, and the output shaft of the motor extends out of the housing of the motor; when the motor rotates, the steering knuckle 1 rotates following the output shaft, that is, the steering knuckle 1 rotates with the axis of the second connecting hole 121 as its rotation axis. In this way, the structure is simple, reliable, and convenient to control; specifically, the motor can be a permanent magnet DC motor, and compared with other excited DC motors, the permanent magnet DC motor has advantages of small volume, high efficiency, simple structure, less copper, etc. and is the main type of low power DC motor. More specifically, the motor may be a brushless DC motor and equipped with a planetary gear reduction box and a servo motor driver; it can be understood that the steering drive component may also be other power components, such as a hydraulic motor.

In addition, in order to prevent the output shaft of the motor from freely rotating, the free rotation of the output shaft of the motor can be restricted through the holding torque of the motor by keeping the motor energized, or the free rotation of the output shaft of the motor can also be restricted by providing a lock device inside the motor, but the present disclosure is not limited thereto.

In the present embodiment, the lower end of the housing of the motor is provided with a bearing 4, in which the output shaft is rotatably inserted in the bearing 4 and connected to the steering knuckle 1 through the bearing 4. The steering device is further provided with an axial fixing part 5, in which the axial fixing part 5 is fixedly sleeved on the lower end of the output shaft, and the upper end of the axial fixing part 5 abuts against the bottom end of the steering knuckle 1, so that the axial directions of the steering knuckle 1 and the steering driving component 3 are fixed. Preferably, the bearing 4 is a tapered roller bearing, so that it can bear the axial load in addition to the radial load; the output shaft is fixedly connected to the second connecting hole 121 through a flat key, in which the second connecting hole 121 is a flat key slotted hole (see Embodiment 1) for transmitting torque more stably and reliably; the axial fixing part 5 is a nut, and the lower end surface of the output shaft is provided with an external thread matched with the nut; it can be understood that the bearing 4 can also be other types of bearings, for example, angular contact ball bearings; the output shaft and the second connecting hole 121 are fixedly connected by a flat key and a flat key slotted hole, or by other means, see Embodiment 1; the axial fixing part 5 can also be provided with other fixing manners, for example, the shaft retaining ring is provided to fix the axial fixing part, and a retaining ring groove needs to be disposed at the lower end of the output shaft.

Further, the steering device may further be provided with a support member 9 fixedly connected to the lower end of the housing of the motor, and the lower cross arm 7 is connected to the support member 9 by a pin or bolt. The bottom of the support member 9 is provided with a groove in which the bearing 4 is fixed. Compared with the housing of the motor, the support member 9 has higher strength and more reliable fixation.

In the present embodiment, the steering device further includes an upper cross arm 6 and a lower cross arm 7. The upper cross arm 6 is disposed above the steering knuckle 1 and is connected with the damping end 13. The lower cross arm 7 is disposed below the steering knuckle 1 and is connected with the fixing portion 31. The upper cross arm 6 can rotate up-and-down or back-and-forth with the connection point of the upper cross arm 6 and the damping end 13 as the pivot, and the lower cross arm 7 can rotate up-and-down with the connection point of the lower cross arm 7 and the fixing portion 31 as the pivot. A damper 8 is disposed between the upper cross arm 6 and the lower cross arm 7, in which the damper 8 is located at the side of the motor facing away from the first connecting hole 111. The lower end of the damper 8 is connected to the lower cross arm 7, and the preset force direction of the damper 8 is the vertical direction. The damper 8 is more easily mounted by the upper cross arm 6 and the lower cross arm 7. It can be understood that the damper can also be mounted through other means, such as the damper directly connected to the housing of the motor. It will also be appreciated that the lower cross arm 7 can also be connected to the driving end of the steering knuckle.

Specifically, one end of the upper cross arm 6 is connected to the third connecting hole 131 through a pin 10, one end of the lower cross arm 7 is connected to the housing of the motor through a pin or a bolt, and the other ends of the upper cross arm 6 and the lower cross arm 7 are respectively hinged to the vehicle body. A damper seat 701 for connecting the damper 8 is disposed on the lower cross arm 7. The pin 10 can be a ball stud, so that the upper cross arm 6 can rotate up-and-down or back-and-forth with the connection point of the cross arm 6 and the shock end 13 as the pivot; the damper 8 can be a spring damper, in which the spring damper has advantage of simple implementation and reliable use; it can be understood that the pin 10 can also be of other types, for example, a combination of two cylindrical pins in different directions, and the damper 8 can also be other dampers such as hydraulic dampers.

Part of the working process of the steering device is as follows: when the turning wheel encounters an obstacle, the turning wheel is lifted up, driving the knuckle, the motor and the ball pin that are fixed together to move upward, and the ball pin makes the end of the upper cross arm connected to the ball pin move upward about the articulated shaft of the other end of the upper cross arm, and the motor makes the end of the lower cross arm connected to the motor move upward about the articulated shaft of the other end of the lower cross arm, in order to compress the damper. The articulated shafts by which the upper cross arm and the lower cross arm are connected to the vehicle body are disposed one above the other. When an obstacle is encountered, one end of the lower cross arm rotates upward while pulling the driving end of the steering knuckle to move inward, so that the turning wheel remains in a state perpendicular to the ground when being lifted upward.

Embodiment 3

The embodiment of the present disclosure further provides a vehicle which includes a turning wheel 2 and the steering device according to Embodiment 2; the axle of the turning wheel 2 is coupled to the steering knuckle 1 by the first connecting hole 111.

At least one wheel forward driving member is disposed on the axle of the turning wheel, and the wheel forward driving component includes a wheel fixing portion and a wheel driving portion, in which the wheel fixing portion is fixed to an axle of the turning wheel, the inner end of the wheel driving portion is rotatably sleeved on the wheel fixing portion, and the outer end of the wheel driving portion is fixed to the turning wheel of the vehicle.

Specifically, the wheel forward driving component is an in-wheel motor, in which the stator of the in-wheel motor is the wheel fixing portion, and the rotor of the in-wheel motor is the wheel driving portion. Compared with the structure of a conventional vehicle which drives two front wheels or drives four wheels by one engine, the technical solution using the in-wheel motor is simpler, will not hinder and interfere with the structure of the vehicle steering device of the embodiment of the present disclosure, and can better play the role of the vehicle steering device. It can be understood that it is also possible to drive the steering wheel forward in a conventional manner while the wheel forward drive component is not provided on the axle of the turning wheel.

The above is only a specific description of the preferred embodiments of the present disclosure, and is not intended to limit the scope of the present disclosure, and any other equivalents are intended to fall within the scope of the present disclosure.

The invention claimed is:

1. A steering device of a turning wheel of a vehicle, wherein the steering device comprises a steering driving component and a steering knuckle,
    wherein the steering knuckle comprises a steering end connected to the turning wheel and a driving end connected to the steering driving component, wherein the driving end is located above or below a side of the steering end, the steering end and the driving end are fixedly connected, the steering end is provided with a first connecting hole, and the driving end is provided with a second connecting hole,
    wherein an axis of the second connecting hole and an axis of the first connecting hole are in the same plane, and the axis of the second connecting hole is not parallel to the axis of the first connecting hole,
    wherein the steering driving component comprises a fixing portion and a driving portion, one end of the fixing portion is mounted with the driving portion, the fixing portion is connected to a vehicle body of the vehicle, the driving portion is fixedly connected to the second connecting hole, and when the driving portion rotates, the steering knuckle rotates with a rotation of the driving portion,
    wherein the steering driving component is a motor, a housing of the motor is the fixing portion, and an output shaft of the motor is the driving portion,
    wherein a lower end of the housing of the motor is provided with a bearing, the output shaft is rotatably inserted in the bearing and connected to the steering knuckle through the bearing, the steering device is further provided with an axial fixing part for fixing the steering knuckle and the steering driving component, the axial fixing part is fixedly sleeved on a lower end of the output shaft, and an upper end of the axial fixing part abuts against a bottom end of the steering knuckle.

2. The steering device according to claim 1, wherein the steering knuckle further comprises a damping end connected to the vehicle body of the vehicle, wherein the damping end is located above the side of the steering end, the driving end is located below the side of the steering end, the damping end is provided with a third connecting hole connected to the vehicle body, the axis of the second connecting hole and an axis of the third connecting hole are located in the same line, the damping end, the steering end and the driving end are all fixedly connected, and the damping end, the steering end and the driving end form a C-shape.

3. The steering device according to claim 2, wherein the axis of the first connecting hole, the axis of the second connecting hole and the axis of the third connecting hole are all in the same plane, the axis of the second connecting hole and the axis of the third connecting hole are non-perpendicularly intersected with the axis of the first connecting hole, an upper ends of the axis of the second connecting hole and an upper end of the axis of the third connecting hole tilt a preset angle to a side away from the first connecting hole.

4. The steering device according to claim 2, wherein the steering device further comprises an upper cross arm and a lower cross arm, the upper cross arm is disposed above the steering knuckle and is connected with the damping end, the lower cross arm is disposed below the steering knuckle and is connected with the fixing portion, the upper cross arm is configured to rotate up-and-down or back-and-forth with a connection point of the upper cross arm and the damping end as a pivot, the lower cross arm is configured to rotate up-and-down with a connection point of the lower cross arm and the fixing portion as a pivot, a damper is disposed between the upper cross arm and the lower cross arm, the damper is located at a side of the motor facing away from the first connecting hole, a lower end of the damper is connected to the lower cross arm, and a preset force direction of the damper is a vertical direction.

5. The steering device according claim 1, wherein the steering knuckle further comprises at least two brake caliper mounting portions, wherein the brake caliper mounting portions are disposed on the side of the steering end, and the brake caliper mounting portions are provided with at least one mounting hole.

6. A vehicle, comprising a turning wheel and a steering device, wherein the steering device comprises a steering driving component and a steering knuckle,
    wherein the steering knuckle comprises a steering end connected to the turning wheel and a driving end connected to the steering driving component, wherein the driving end is located above or below a side of the steering end, the steering end and the driving end are fixedly connected, the steering end is provided with a first connecting hole, and the driving end is provided with a second connecting hole,
    wherein an axis of the second connecting hole and an axis of the first connecting hole are in the same plane, and the axis of the second connecting hole is not parallel to the axis of the first connecting hole,
    wherein the steering driving component comprises a fixing portion and a driving portion, one end of the fixing portion is mounted with the driving portion, the fixing portion is connected to a vehicle body of the vehicle, the driving portion is fixedly connected to the second connecting hole, and when the driving portion rotates, the steering knuckle rotates with a rotation of the driving portion,
    wherein the steering driving component is a motor, a housing of the motor is the fixing portion, and an output shaft of the motor is the driving portion,
    wherein a lower end of the housing of the motor is provided with a bearing, the output shaft is rotatably inserted in the bearing and connected to the steering knuckle through the bearing, the steering device is further provided with an axial fixing part for fixing the steering knuckle and the steering driving component, the axial fixing part is fixedly sleeved on a lower end of the output shaft, and an upper end of the axial fixing part abuts against a bottom end of the steering knuckle, wherein an axle of the turning wheel is coupled to the steering knuckle by the first connecting hole.

* * * * *